(12) United States Patent
Gan et al.

(10) Patent No.: US 6,350,546 B1
(45) Date of Patent: Feb. 26, 2002

(54) SULFATE ADDITIVES FOR NONAQUEOUS ELECTROLYTE RECHARGEABLE CELLS

(75) Inventors: Hong Gan; Esther S. Takeuchi, both of East Amherst, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 0 days.

(21) Appl. No.: 09/519,534

(22) Filed: Mar. 6, 2000

Related U.S. Application Data

(63) Continuation-in-part of application No. 09/491,355, filed on Jan. 26, 2000, now Pat. No. 6,265,106, which is a continuation-in-part of application No. 09/460,035, filed on Dec. 13, 1999, now Pat. No. 6,180,283, which is a continuation-in-part of application No. 09/009,557, filed on Jan. 20, 1988, now Pat. No. 6,013,394.

(51) Int. Cl.$^7$ ................................................ H01M 6/16
(52) U.S. Cl. ................... 429/340; 429/347; 429/205; 429/231.1; 429/231.2; 429/231.3; 429/231.5; 429/231.8; 429/231.95; 429/330; 429/332; 429/221; 429/223; 429/322; 429/319; 429/232
(58) Field of Search ................................. 429/340, 347, 429/215, 205, 231.1, 231.95, 325, 328, 330, 332, 333, 335, 231.2, 231.3, 231.5, 231.8, 221, 223, 322, 319, 232

(56) References Cited

U.S. PATENT DOCUMENTS

| | | | |
|---|---|---|---|
| 3,567,515 A | 3/1971 | Maricle et al. | |
| 4,444,855 A | 4/1984 | Blomgren et al. | 429/105 |
| 4,482,616 A | 11/1984 | Connelly et al. | 429/101 |
| 4,489,144 A | 12/1984 | Clark | 429/196 |
| 4,520,084 A | 5/1985 | Tinker et al. | 429/101 |
| 4,612,265 A | 9/1986 | Connelly et al. | 429/196 |
| 4,906,538 A | 3/1990 | Toyosawa et al. | 429/197 |
| 4,957,833 A | 9/1990 | Daifuku et al. | 429/332 |
| 5,472,810 A | 12/1995 | Takeuchi et al. | 429/217 |
| 6,180,283 B1 * | 1/2001 | Gan et al. | 429/215 |
| 6,221,534 B1 * | 4/2001 | Takeuchi et al. | 429/347 |
| 6,265,106 B1 * | 7/2001 | Gan et al. | 429/215 |

FOREIGN PATENT DOCUMENTS

JP 09245833 9/1997

* cited by examiner

Primary Examiner—Laura Weiner
(74) Attorney, Agent, or Firm—Hodgson Russ LLP

(57) ABSTRACT

A lithium ion electrochemical cell having high charge/discharge capacity, long cycle life and exhibiting a reduced first cycle irreversible capacity, is described. The stated benefits are realized by the addition of at least one sulfate additive to an electrolyte comprising an alkali metal salt dissolved in a solvent mixture that includes ethylene carbonate, dimethyl carbonate, ethylmethyl carbonate and diethyl carbonate. The preferred additive is selected from a silyl sulfate, tin sulfate or an organic sulfate.

35 Claims, No Drawings

SULFATE ADDITIVES FOR NONAQUEOUS ELECTROLYTE RECHARGEABLE CELLS

CROSS-REFERENCE TO RELATED APPLICATION

This application is a continuation-in-part of application Ser. No. 09/491,355, filed Jan. 26, 2000, now U.S. Pat. No. 6,265,106, which in turn is a continuation-in-part of application Ser. No. 09/460,035, filed Dec. 13, 1999, now U.S. Pat. No. 6,180,283 which is a continuation in part application of application Ser. No. 09/009,557, filed Jan. 20, 1988 now U.S. Pat. No. 6,013,394.

BACKGROUND OF INVENTION

1. Field of the Invention

The present invention generally relates to an alkali metal electrochemical cell, and more particularly, to a rechargeable alkali metal cell. Still more particularly, the present invention relates to a lithium ion electrochemical cell activated with an electrolyte having an additive provided to achieve high charge/discharge capacity, long cycle life and to minimize the first cycle irreversible capacity. According to the present invention, the preferred additive to the activating electrolyte is a sulfate compound.

2. Prior Art

Alkali metal rechargeable cells typically comprise a carbonaceous anode electrode and a lithiated cathode electrode. Due to the high potential of the cathode material (up to 4.3V vs. Li/Li$^+$ for Li$_{1-x}$CoO$_2$) and the low potential of the carbonaceous anode material (0.01V vs. Li/Li$^+$ for graphite) in a fully charged lithium ion cell, the choice of the electrolyte solvent system is limited. Since carbonate solvents have high oxidative stability toward typically used lithiated cathode materials and good kinetic stability toward carbonaceous anode materials, they are generally used in lithium ion cell electrolytes. To achieve optimum cell performance (high rate capability and long cycle life), solvent systems containing a mixture of a cyclic carbonate (high dielectric constant solvent) and a linear carbonate (low viscosity solvent) are typically used in commercial secondary cells. Cells with carbonate based electrolytes are known to deliver more than 1000 charge/discharge cycles at room temperature.

U.S. patent application Ser. No. 09/133,799, which is assigned to the assignee of the present invention and incorporated herein by reference, is directed to a quaternary mixture of organic carbonate solvents in the activating electrolyte for a lithium ion cell capable of discharge at temperatures below −20° C. and down to as low as −40° C. while exhibiting good cycling characteristics. The quaternary solvent system includes ethylene carbonate (EC), dimethyl carbonate (DMC), ethylmethyl carbonate (EMC) and diethyl carbonate (DEC).

Lithium ion cell design generally involves a trade off in one area for a necessary improvement in another, depending on the targeted cell application. The achievement of a lithium-ion cell capable of low temperature cycleability by use of the above quaternary solvent electrolyte, in place of a typically used binary solvent electrolyte (such as 1.0M LiPF$_6$/EC:DMC=30:70, v/v which freezes at −11° C.), is obtained at the expense of increased first cycle irreversible capacity during the initial charging (approximately 65 mAh/g graphite for 1.0M LiPF$_6$/EC:DMC:EMC:DEC= 45:22:24.8:8.2 vs. 35 mAh/g graphite for 1.0M LiPF$_6$/EC:DMC=30:70). Due to the existence of this first cycle irreversible capacity, lithium ion cells are generally cathode limited. Since all of the lithium ions, which shuttle between the anode and the cathode during charging and discharging originally come from the lithiated cathode, the larger the first cycle irreversible capacity, the lower the cell capacity in subsequent cycles and the lower the cell efficiency. Thus, it is desirable to minimize or even eliminate the first cycle irreversible capacity in lithium ion cells while at the same time maintaining the low temperature cycling capability of such cells.

According to the present invention, these objectives are achieved by providing an organic sulfate in the quaternary solvent electrolyte. Lithium ion cells activated with these electrolytes exhibit lower first cycle irreversible capacities relative to cells activated with the same quaternary solvent electrolyte devoid of the sulfate additive. As a result, cells including the sulfate additive present higher subsequent cycling capacity than control cells. The cycleability of the present invention cells at room temperature, as well as at low temperatures, i.e., down to about −40° C., is as good as cells activated with the quaternary electrolyte devoid of a sulfate additive.

SUMMARY OF THE INVENTION

It is commonly known that when an electrical potential is initially applied to lithium ion cells constructed with a carbon anode in a discharged condition to charge the cell, some permanent capacity loss occurs due to the anode surface passivation film formation. This permanent capacity loss is called first cycle irreversible capacity. The film formation process, however, is highly dependent on the reactivity of the electrolyte components at the cell charging potentials. The electrochemical properties of the passivation film are also dependent on the chemical composition of the surface film.

The formation of a surface film is unavoidable for alkali metal systems, and in particular, lithium metal anodes, and lithium intercalated carbon anodes due to the relatively low potential and high reactivity of lithium toward organic electrolytes. The ideal surface film, known as the solid-electrolyte interphase (SEI), should be electrically insulating and ionically conducting. While most alkali metal, and in particular, lithium electrochemical systems meet the first requirement, the second requirement is difficult to achieve. The resistance of these films is not negligible, and as a result, impedance builds up inside the cell due to this surface layer formation which induces unacceptable polarization during the charge and discharge of the lithium ion cell. On the other hand, if the SEI film is electrically conductive, the electrolyte decomposition reaction on the anode surface does not stop due to the low potential of the lithiated carbon electrode.

Hence, the composition of the electrolyte has a significant influence on the discharge efficiency of alkali metal systems, and particularly the permanent capacity loss in secondary cells. For example, when 1.0M LiPF$_6$/EC:DMC=30:70 is used to activate a secondary cell, the first cycle irreversible capacity is approximately 35 mAh/g of graphite. However, under the same cycling conditions, the first cycle irreversible capacity is found to be approximately 65 mAh/g of graphite when 1.0M LiPF$_6$/EC:DMC:EMC:DEC=45:22:24.8:8.2 is used as the electrolyte. Further, lithium ion cells activated with the binary solvent electrolyte of ethylene carbonate and dimethyl carbonate cannot be cycled at temperatures less than about −11° C. The quaternary solvent electrolyte of the previously referenced patent application, which enables lithium ion cells to cycle at much lower temperatures, is a compromise in terms of providing a wider temperature application with acceptable cycling efficiencies. It would be highly desirable to retain the benefits of a lithium ion cell capable of operating at temperatures down to as low as about −40° C. while minimizing the first cycle irreversible capacity.

According to the present invention, this objective is achieved by adding a sulfate additive in the above described quaternary solvent electrolytes. In addition, this invention may be generalized to other nonaqueous organic electrolyte systems, such as binary solvent and ternary solvent systems, as well as the electrolyte systems containing solvents other than mixtures of linear or cyclic carbonates. For example, linear or cyclic ethers or esters may also be included as electrolyte components. Although the exact reason for the observed improvement is not clear, it is hypothesized that the sulfate additive competes with the existing electrolyte components to react on the carbon anode surface during initial lithiation to form a beneficial SEI film. The thusly formed SEI film is electrically more insulating than the film formed without the sulfate additive and, as a consequence, the lithiated carbon electrode is better protected from reactions with other electrolyte components. Therefore, lower first cycle irreversible capacity is obtained.

These and other objects of the present invention will become increasingly more apparent to those skilled in the art by reference to the following description.

DETAILED DESCRIPTION OF THE PREFERRED EMBODIMENTS

A secondary electrochemical cell constructed according to the present invention includes an anode active material selected from Groups IA, IIA, or IIIB of the Periodic Table of Elements, including the alkali metals lithium, sodium, potassium, etc. The preferred anode active material comprises lithium.

In secondary electrochemical systems, the anode electrode comprises a material capable of intercalating and de-intercalating the alkali metal, and preferably lithium. A carbonaceous anode comprising any of the various forms of carbon (e.g., coke, graphite, acetylene black, carbon black, mosecarbon micro beads, glassy carbon, etc.) which are capable of reversibly retaining the lithium species, is preferred. Graphite is particularly preferred due to its relatively high lithium-retention capacity. Regardless of the form of the carbon, fibers of the carbonaceous material are particularly advantageous because the fibers have excellent mechanical properties which permit them to be fabricated into rigid electrodes that are capable of withstanding degradation during repeated charge/discharge cycling. Moreover, the high surface area of carbon fibers allows for rapid charge/discharge rates. A preferred carbonaceous material for the anode of a secondary electrochemical cell is described in U.S. Pat. No. 5,443,928 to Takeuchi et al., which is assigned to the assignee of the present invention and incorporated herein by reference.

A typical secondary cell anode is fabricated by mixing about 90 to 97 weight percent graphite with about 3 to 10 weight percent of a binder material which is preferably a fluoro-resin powder such as polytetrafluoroethylene (PTFE), polyvinylidene fluoride (PVDF), polyethylenetetrafluoroethylene (ETFE), polyamides and polyimides, and mixtures thereof. This electrode active admixture is provided on a current collector such as of a nickel, stainless steel, or copper foil or screen by casting, pressing, rolling or otherwise contacting the active admixture thereto.

The anode component further has an extended tab or lead of the same material as the anode current collector, i.e., preferably nickel, integrally formed therewith such as by welding and contacted by a weld to a cell case of conductive metal in a case-negative electrical configuration. Alternatively, the carbonaceous anode may be formed in some other geometry, such as a bobbin shape, cylinder or pellet to allow an alternate low surface cell design.

The cathode of a secondary cell preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

Before fabrication into an electrode for incorporation into an electrochemical cell, the lithiated active material is preferably mixed with a conductive additive. Suitable conductive additives include acetylene black, carbon black and/or graphite. Metals such as nickel, aluminum, titanium and stainless steel in powder form are also useful as conductive diluents when mixed with the above listed active materials. The electrode further comprises a fluororesin binder, preferably in a powder form, such as PTFE, PVDF, ETFE, polyamides and polyimides, and mixtures thereof.

To charge such secondary cells, the lithium ion comprising the cathode is intercalated into the carbonaceous anode by applying an externally generated electrical potential to recharge the cell. The applied recharging electrical potential serves to draw the alkali metal ions from the cathode material, through the electrolyte and into the carbonaceous anode to saturate the carbon comprising the anode. The resulting $Li_xC_6$ electrode can have an x ranging between 0.1 and 1.0. The cell is then provided with an electrical potential and is discharged in a normal manner.

An alternate secondary cell construction comprises intercalating the carbonaceous material with the active alkali material before the anode is incorporated into the cell. In this case, the cathode body can be solid and comprise, but not be limited to, such materials as manganese dioxide, silver vanadium oxide, copper silver vanadium oxide, titanium disulfide, copper oxide, copper sulfide, iron sulfide, iron disulfide and fluorinated carbon. However, this approach is compromised by the problems associated with handling lithiated carbon outside of the cell. Lithiated carbon tends to react when contacted by air.

The secondary cell of the present invention includes a separator to provide physical segregation between the anode and cathode active electrodes. The separator is of an electrically insulative material to prevent an internal electrical short circuit between the electrodes, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. The form of the separator typically is a sheet which is placed between the anode and cathode electrodes. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

Illustrative separator materials include fabrics woven from fluoropolymeric fibers of polyethylenetetrafluoroethylene and polyethylenechlorotrifluoroethylene used either alone or laminated with a fluoropolymeric microporous film. Other suitable separator materials include non-woven glass, polypropylene, polyethylene, glass fiber materials, ceramics, a polytetraflouroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.).

The choice of an electrolyte solvent system for activating an alkali metal electrochemical cell, and particularly a fully charged lithium ion cell is very limited due to the high potential of the cathode material (up to 4.3V vs. Li/Li$^+$ for Li$_{1-x}$CoO$_2$) and the low potential of the anode material (0.01V vs. Li/Li$^+$ for graphite). According to the present invention, suitable nonaqueous electrolytes are comprised of an inorganic salt dissolved in a nonaqueous solvent and more preferably an alkali metal salt dissolved in a quaternary mixture of organic carbonate solvents comprising dialkyl (non-cyclic) carbonates selected from dimethyl carbonate (DMC), diethyl carbonate (DEC), dipropyl carbonate (DPC), ethylmethyl carbonate (EMC), methylpropyl carbonate (MPC) and ethylpropyl carbonate (EPC), and mixtures thereof, and at least one cyclic carbonate selected from propylene carbonate (PC), ethylene carbonate (EC), butylene carbonate (BC) and vinylene carbonate (VC), and mixtures thereof. Organic carbonates are generally used in the electrolyte solvent system for such battery chemistries because they exhibit high oxidative stability toward cathode materials and good kinetic stability toward anode materials.

Preferred electrolytes according to the present invention comprise solvent mixtures of EC:DMC:EMC:DEC. Most preferred volume percent ranges for the various carbonate solvents include EC in the range of about 10% to about 50%; DMC in the range of about 5% to about 75%; EMC in the range of about 5% to about 50%; and DEC in the range of about 3% to about 45%. Electrolytes containing this quaternary carbonate mixture exhibit freezing points below −50° C., and lithium ion cells activated with such mixtures have very good cycling behavior at room temperature as well as very good discharge and charge/discharge cycling behavior at temperatures below −20° C.

Known lithium salts that are useful as a vehicle for transport of alkali metal ions from the anode to the cathode, and back again include LiPF$_6$, LiBF$_4$, LiAsF$_6$, LiSbF$_6$, LiClO$_4$, LiAlCl$_4$, LiGaCl$_4$, LiC(SO$_2$CF$_3$)$_3$, LiNO$_3$, LiN(SO$_2$CF$_3$)$_2$, LiSCN, LiO$_3$SCF$_2$CF$_3$, LiC$_6$F$_5$SO$_3$, LiO$_2$CCF$_3$, LiSO$_3$F, LiB(C$_6$H$_5$)$_4$ and LiCF$_3$SO$_3$, and mixtures thereof. Suitable salt concentrations typically range between about 0.8 to 1.5 molar.

In accordance with the present invention, at least one organic sulfate additive is provided in the electrolyte. The sulfate additive preferably has the general formula R$^1$OS(=O)$_2$(OR$^2$), and is selected from the group consisting of a silyl sulfate, a tin sulfate, and an organic sulfate having at least one unsaturated hydrocarbon containing a C(sp$^2$ or sp$^3$)—C(sp$^3$) bond unit having the C(sp$^3$) carbon directly connected to the —OSO$_3$— functional group. In the general formula R$^1$ and R$^2$ are the same or different, and they can both be a hydrogen atom or an organic group containing 1 to 12 carbon atoms, and wherein at least R$^1$ has the structure (R$^3$) (R$^4$) (R$^5$)C— if R$^2$≠H with at least R$^3$ being an aromatic substituent or an unsaturated organic or inorganic group and wherein if any of the remaining groups of R$^4$ and R$^5$ is a saturated organic group, the saturated organic group contains 1 to 11 carbon atoms.

The greatest effect is found when diallyl sulfate, methyl benzyl sulfate, ethyl benzyl sulfate, propyl benzyl sulfate, butyl benzyl sulfate, pentyl benzyl sulfate, methyl allyl sulfate, ethyl allyl sulfate, propyl allyl sulfate, butyl allyl sulfate, pentyl allyl sulfate, mono-methyl sulfate, mono-ethyl sulfate, mono-butyl sulfate, mono-propyl sulfate, mono-pentyl sulfate, mono-allyl sulfate, mono-benzyl sulfate, dibenzyl sulfate, mono-trimethyltin sulfate, mono-triethyltin sulfate, mono-tripropyltin sulfate, mono-tributyltin sulfate, mono-tripentyltin sulfate, bis(trimethyltin) sulfate, bis(triethyltin) sulfate, bis(tripropyltin) sulfate, bis(tributyltin) sulfate, bis(tripentyltin) sulfate, mono-trimethylsilyl sulfate, mono-triethylsilyl sulfate, mono-tripropylsilyl sulfate, mono-tributylsilyl sulfate, mono-tripentylsilyl sulfate, bis(trimethylsilyl) sulfate, bis(triethylsilyl) sulfate, bis(tripropylsilyl) sulfate, bis(tributylsilyl) sulfate and bis(tripentylsilyl) sulfate and mixtures thereof.

The above-described compounds are only intended to be exemplary of those that are useful with the present invention, and are not to be construed as limiting. Those skilled in the art will readily recognize sulfate compounds which come under the purview of the general formula set forth above and which will be useful as additives for the electrolyte to reduce voltage delay according to the present invention.

While not intending to be bound by any particular mechanism, it is believed that due to the presence of the —OSO$_3$— functional group, the bond between oxygen and at least one of the group R$^1$ and R$^2$ is readily severed and the sulfate intermediate is able to compete effectively with the other electrolyte solvents or solutes to react with lithium and form a sulfate salt, i.e., lithium sulfate, or the lithium salt of a sulfate reduction product on the surface of the anode. The resulting salt is more conductive than lithium oxide which may form on the anode in the absence of the organic sulfate additive.

In fact, it is believed that lithium sulfate or the lithium salt of a sulfate reduction product on the surface of the anode provides for the existence of charge delocalization due to resonance equilibration at the anode surface. This equilibration allows lithium ions to travel easily from one molecule to the other via a lithium ion exchange mechanism. As a result, beneficial ionic conductance is realized. Accordingly, it is believed that the present sulfate compounds compete more effectively with the other solvents in the electrolyte to form an ionically more conductive and electrically more insulative film than is provided by nonaqueous electrolytes devoid of the present sulfate compounds. As a consequence, the chemical composition and perhaps the morphology of the carbonaceous anode surface protective layer is believed to be changed with concomitant benefits to the cell's cycling characteristics.

The assembly of the cell described herein is preferably in the form of a wound element cell. That is, the fabricated cathode, anode and separator are wound together in a "jellyroll" type configuration or "wound element cell stack" such that the anode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium or aluminum, but not limited thereto, so long as the metallic material is compatible for use with components of the cell.

The cell header comprises a metallic disc-shaped body with a first hole to accommodate a glass-to-metal seal/ terminal pin feedthrough and a second hole for electrolyte filling. The glass used is of a corrosion resistant type having up to about 50% by weight silicon such as CABAL 12, TA 23 or FUSITE 425 or FUSITE 435. The positive terminal pin feedthrough preferably comprises titanium although molybdenum, aluminum, nickel alloy, or stainless steel can also be used. The cell header comprises elements having compatibility with the other components of the electrochemical cell and is resistant to corrosion. The cathode lead is welded to the positive terminal pin in the glass-to-metal seal and the header is welded to the case containing the electrode stack. The cell is thereafter filled with the electrolyte solution comprising at least one of the sulfate additives described hereinabove and hermetically sealed such as by close-welding a stainless steel ball over the fill hole, but not limited thereto.

The above assembly describes a case-negative cell, which is the preferred construction of the exemplary cell of the present invention. As is well known to those skilled in the art, the exemplary electrochemical system of the present invention can also be constructed in a case-positive configuration.

The concentration limit for the sulfate additive is preferably about 0.001M to about 0.40M. The beneficial effect of the sulfate additive will not be apparent if the additive concentration is less than about 0.001M. On the other hand, if the additive concentration is greater than about 0.40M, the beneficial effect of the additive will be canceled by the detrimental effect of higher internal cell resistance due to the thicker anode surface film formation and lower electrolyte conductivity.

It is appreciated that various modifications to the inventive concepts described herein may be apparent to those of ordinary skill in the art without departing from the spirit and scope of the present invention as defined by the appended claims.

What is claimed is:

1. An electrochemical cell, which comprises:
    a) a negative electrode which intercalates with an alkali metal;
    b) a positive electrode comprising an electrode active material which intercalates with the alkali metal;
    c) a nonaqueous electrolyte including a quaternary, nonaqueous carbonate solvent mixture and activating the negative and the positive electrodes; and
    d) a sulfate additive provided in the electrolyte, wherein the sulfite additive has the general formula: $R^1OS(=O)_2(OR^2)$ and is selected from the group consisting of a silyl sulfate, a tin sulfate and an organic sulfate having at least one unsaturated hydrocarbon containing a $C(sp^2$ or $sp^3)$—$C(sp^3)$ bond unit having the $C(sp^3)$ carbon directly connected to the —$OSO_3$— functional group and wherein $R^1$ and $R^2$ are the same or different and they can both be a hydrogen atom or an organic group containing 1 to 12 carbon atoms, and wherein at least $R^1$ has the structure $(R^3)(R^4)(R^5)C$— if $R^2 \neq H$ with at least $R^3$ being an aromatic substituent or an unsaturated organic or inorganic group and wherein if any of the remaining groups of $R^4$ and $R^5$ is a saturated organic group, the saturated organic group contains 1 to 11 carbon atoms.

2. The electrochemical cell of claim 1 wherein the sulfate additive is selected from the group consisting of diallyl sulfate, methyl benzyl sulfate, ethyl benzyl sulfate, propyl benzyl sulfate, butyl benzyl sulfate, pentyl benzyl sulfate, methyl allyl sulfate, ethyl allyl sulfate, propyl allyl sulfate, butyl allyl sulfate, pentyl allyl sulfate, mono-methyl sulfate, mono-ethyl sulfate, mono-butyl sulfate, mono-propyl sulfate, mono-pentyl sulfate, mono-allyl sulfate, monobenzyl sulfate, dibenzyl sulfate, mono-trimethyltin sulfate, mono-triethyltin sulfate, mono-tripropyltin sulfate, mono-tributyltin sulfate, mono-tripentyltin sulfate, bis(trimethyltin) sulfate, bis(triethyltin) sulfate, bis(tripropyltin) sulfate, bis(tributyltin) sulfate, bis(tripentyltin) sulfate, mono-trimethylsilyl sulfate, mono-triethylsilyl sulfate, mono-tripropylsilyl sulfate, mono-tributylsilyl sulfate, mono-tripentylsilyl sulfate, bis(trimethylsilyl) sulfate, bis(triethylsilyl) sulfate, bis(tripropylsilyl) sulfate, bis(tributylsilyl) sulfate and bis(tripentylsilyl) sulfate, mixtures thereof.

3. The electrochemical cell of claim 1 wherein the sulfate additive is present in the electrolyte in a range of about 0.001M to about 0.40M.

4. The electrochemical cell of claim 1 wherein the electrolyte comprises at least one linear carbonate selected from the group consisting of dimethyl carbonate, diethyl carbonate, dipropyl carbonate, ethylmethyl carbonate, methylpropyl carbonate, ethylpropyl carbonate, and mixtures thereof.

5. The electrochemical cell of claim 4 wherein the electrolyte comprises at least three of the linear carbonates.

6. The electrochemical cell of claim 1 wherein the electrolyte comprises at least one cyclic carbonate selected from the group consisting of ethylene carbonate, propylene carbonate, butylene carbonate, vinylene carbonate, and mixtures thereof.

7. The electrochemical cell of claim 1 wherein the electrolyte comprises ethylene carbonate, dimethyl carbonate, ethylmethyl carbonate and diethyl carbonate.

8. The electrochemical cell of claim 7 wherein the ethylene carbonate is in the range of about 10% to about 50%, the dimethyl carbonate is in the range of about 5% to about 75%, the ethylmethyl carbonate is in the range of about 5% to about 50%, and the diethyl carbonate is in the range of about 3% to about 45%, by volume.

9. The electrochemical cell of claim 1 wherein the electrolyte includes an alkali metal salt selected from the group consisting of $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

10. The electrochemical cell of claim 1 wherein the alkali metal is lithium.

11. The electrochemical cell of claim 1 wherein the negative electrode comprises a negative electrode active material selected from the group consisting of coke, carbon black, graphite, acetylene black, carbon fibers, mesocarbon micro beads, glassy carbon, and mixtures thereof.

12. The electrochemical cell of claim 1 wherein the negative electrode active material is mixed with a fluoro-resin binder.

13. The electrochemical cell of claim 1 wherein the positive electrode comprises a positive electrode active material selected from the group consisting of lithiated oxides, lithiated sulfides, lithiated selenides and lithiated tellurides of the group selected from vanadium, titanium, chromium, copper, molybdenum, niobium, iron, nickel, cobalt, manganese, and mixtures thereof.

14. The electrochemical cell of claim 13 wherein the positive electrode active material is mixed with a fluoro-resin binder.

15. The electrochemical cell of claim 13 wherein the positive electrode active material is mixed with a conductive additive selected from the group consisting of acetylene black, carbon black, graphite, nickel powder, aluminum powder, titanium powder, stainless steel powder, and mixtures thereof.

16. An electrochemical cell, which comprises:
   a) a negative electrode which intercalates with lithium;
   b) a positive electrode comprising an electrode active material and which intercalates with lithium; and
   c) an electrolyte solution activating the anode and the cathode, the electrolyte including an alkali metal salt dissolved in a quaternary, nonaqueous carbonate solvent mixture of ethylene carbonate, dimethyl carbonate, ethylmethyl carbonate and diethyl carbonate; and
   d) a sulfate additive provided in the electrolyte, wherein the sulfite additive has the general formula: $R^1OS(=O)_2(OR^2)$ and is selected from the group consisting of a silyl sulfate, a tin sulfate, and an organic sulfate having at least one unsaturated hydrocarbon containing a $C(sp^2$ or $sp^3)$—$C(sp^3)$ bond unit having the $C(sp^3)$ carbon directly connected to the —$OSO_3$— functional group and wherein $R^1$ and $R^2$ are the same or different and they can both be a hydrogen atom or an organic group containing 1 to 12 carbon atoms, and wherein at least $R^1$ has the structure $(R^3) (R^4) (R^5)C$— if $R^2 \neq H$ with at least $R^3$ being an aromatic substituent or an unsaturated organic or inorganic group and wherein if any of the remaining groups of $R^4$ and $R^5$ is a saturated organic group, the saturated organic group contains 1 to 11 carbon atoms.

17. The electrochemical cell of claim 16 wherein the sulfate additive is selected from the group consisting of diallyl sulfate, methyl benzyl sulfate, ethyl benzyl sulfate, propyl benzyl sulfate, butyl benzyl sulfate, pentyl benzyl sulfate, methyl allyl sulfate, ethyl allyl sulfate, propyl allyl sulfate, butyl allyl sulfate, pentyl allyl sulfate, mono-methyl sulfate, mono-ethyl sulfate, mono-butyl sulfate, mono-propyl sulfate, mono-pentyl sulfate, mono-allyl sulfate, mono-benzyl sulfate, dibenzyl sulfate, mono-trimethyltin sulfate, mono-triethyltin sulfate, mono-tripropyltin sulfate, mono-tributyltin sulfate, mono-tripentyltin sulfate, bis(trimethyltin) sulfate, bis(triethyltin) sulfate, bis(tripropyltin) sulfate, bis(tributyltin) sulfate, bis(tripentyltin) sulfate, mono-trimethylsilyl sulfate, mono-triethylsilyl sulfate, mono-tripropylsilyl sulfate, mono-tributylsilyl sulfate, mono-tripentylsilyl sulfate, bis(trimethylsilyl) sulfate, bis(triethylsilyl) sulfate, bis(tripropylsilyl) sulfate, bis(tributylsilyl) sulfate, bis(tripentylsilyl) sulfate and mixtures thereof.

18. The electrochemical cell of claim 16 wherein the ethylene carbonate is in the range of about 10% to about 50%, the dimethyl carbonate is in the range of about 5% to about 75%, the ethylmethyl carbonate is in the range of about 5% to about 50%, and the diethyl carbonate is in the range of about 3% to about 45%, by volume.

19. The electrochemical cell of claim 16 wherein the electrolyte includes an alkali metal salt selected from the group consisting of $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

20. A method for providing an electrochemical cell, comprising the steps of:
   a) providing a negative electrode which intercalates with an alkali metal;
   b) providing a positive electrode comprising an electrode active material which intercalates with the alkali metal;
   c) activating the negative and positive electrodes with a nonaqueous electrolyte including a quaternary, nonaqueous carbonate solvent mixture; and
   d) providing a sulfate additive in the electrolyte, wherein the sulfite additive has the general formula: $R^1OS(=O)_2(OR^2)$ and is selected from the group consisting of a silyl sulfate, a tin sulfate and an organic sulfate having at least one unsaturated hydrocarbon containing a $C(sp^2$ or $sp^3)$—$C(sp^3)$ bond unit having the $C(sp^3)$ carbon directly connected to the—$OSO_3$— functional group and wherein $R^1$ and $R^2$ are the same or different and they can both be a hydrogen atom or an organic group containing 1 to 12 carbon atoms, and wherein at least $R^1$ has the structure $(R^3) (R^4) (R^5)C$— if $R^2 \neq H$ with at least $R^3$ being an aromatic substituent or an unsaturated organic or inorganic group and wherein if any of the remaining groups of $R^4$ and $R^5$ is a saturated organic group, the saturated organic group contains 1 to 11 carbon atoms.

21. The method of claim 20 including selecting the sulfate additive from the group consisting of diallyl sulfate, methyl benzyl sulfate, ethyl benzyl sulfate, propyl benzyl sulfate, butyl benzyl sulfate, pentyl benzyl sulfate, methyl allyl sulfate, ethyl allyl sulfate, propyl allyl sulfate, butyl allyl sulfate, pentyl allyl sulfate, mono-methyl sulfate, mono-ethyl sulfate, mono-butyl sulfate, mono-propyl sulfate, mono-pentyl sulfate, mono-allyl sulfate, mono-benzyl sulfate, dibenzyl sulfate, mono-trimethyltin sulfate, mono-triethyltin sulfate, mono-tripropyltin sulfate, mono-tributyltin sulfate, mono-tripentyltin sulfate, bis(trimethyltin) sulfate, bis(triethyltin) sulfate, bis(tripropyltin) sulfate, bis(tributyltin) sulfate, bis(tripentyltin) sulfate, mono-trimethylsilyl sulfate, mono-triethylsilyl sulfate, mono-tripropylsilyl sulfate, mono-tributylsilyl sulfate, mono-tripentylsilyl sulfate, bis(trimethylsilyl) sulfate, bis(triethylsilyl) sulfate, bis(tripropylsilyl) sulfate, bis(tributylsilyl) sulfate, bis(tripentylsilyl) sulfate and mixtures thereof.

22. The method of claim 20 wherein the sulfate additive is present in the electrolyte in a range of about 0.001M to about 0.40M.

23. The method of claim 20 wherein the electrolyte comprises at least one linear carbonate selected from the group consisting of dimethyl carbonate, diethyl carbonate, dipropyl carbonate, ethylmethyl carbonate, methylpropyl carbonate, ethylpropyl carbonate, and mixtures thereof.

24. The method of claim 23 wherein the electrolyte comprises at least three of the linear carbonates.

25. The method of claim 20 wherein the electrolyte comprises at least one cyclic carbonate selected from the group consisting of ethylene carbonate, propylene carbonate, butylene carbonate, vinylene carbonate, and mixtures thereof.

26. The method of claim 20 wherein the electrolyte comprises ethylene carbonate, dimethyl carbonate, ethylmethyl carbonate and diethyl carbonate.

27. The method of claim 26 wherein the ethylene carbonate is in the range of about 10% to about 50%, the dimethyl carbonate is in the range of about 5% to about 75%, the ethylmethyl carbonate is in the range of about 5% to about 50%, and the diethyl carbonate is in the range of about 3% to about 45%, by volume.

28. The method of claim 20 wherein the electrolyte includes an alkali metal salt selected from the group consisting of $LiPF_6$, $LiBF_4$, $LiAsF_6$, $LiSbF_6$, $LiClO_4$, $LiAlCl_4$, $LiGaCl_4$, $LiNO_2$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

29. The method of claim 20 including providing the alkali metal as lithium.

30. The method of claim 20 including providing the positive electrode comprising a positive electrode active material selected from the group consisting of lithiated oxides, lithiated sulfides, lithiated selenides and lithiated tellurides of the group selected from vanadium, titanium, chromium, copper, molybdenum, niobium, iron, nickel, cobalt, manganese, and mixtures thereof.

31. The method of claim 20 including providing the negative electrode comprising a negative electrode active material selected from the group consisting of coke, carbon black, graphite, acetylene black, carbon fibers, mesocarbon micro beads, glassy carbon, and mixtures thereof.

32. An electrochemical cell, which comprises:
   a) a negative electrode of a negative electrode active material which intercalates with an alkali metal, wherein the negative electrode active material is selected from the group consisting of coke, carbon black, graphite, acetylene black, carbon fibers, mesocarbon micro beads, glassy carbon, and mixtures thereof;
   b) a positive electrode comprising an electrode active material which intercalates with the alkali metal;
   c) a nonaqueous electrolyte activating the negative and the positive electrodes; and
   d) a sulfate additive provided in the electrolyte, wherein the sulfite additive has the general formula: $R^1OS(=O)_2(OR^2)$ and is selected from the group consisting of a silyl sulfate, a tin sulfate and an organic sulfate having at least one unsaturated hydrocarbon containing a $C(sp^2$ or $sp^3)$—$C(sp^3)$ bond unit having the $C(sp^3)$ carbon directly connected to the—$OSO_3$— functional group and wherein $R^1$ and $R^2$ are the same or different and they can both be a hydrogen atom or an organic group containing 1 to 12 carbon atoms, and wherein at least $R^1$ has the structure $(R^3)(R^4)(R^5)C$— if $R^2 \neq H$ with at least $R^3$ being an aromatic substituent or an unsaturated organic or inorganic group and wherein if any of the remaining groups of $R^4$ and $R^5$ is a saturated organic group, the saturated organic group contains 1 to 11 carbon atoms.

33. The electrochemical cell of claim 32 wherein the electrolyte includes a quaternary, nonaqueous carbonate solvent mixture.

34. A method for providing an electrochemical cell, comprising the steps of:
   a) providing a negative electrode of a negative electrode active material which intercalates with an alkali metal and including selecting the negative electrode active material from the group consisting of coke, carbon black, graphite, acetylene black, carbon fibers, mesocarbon micro beads, glassy carbon, and mixtures thereof;
   b) providing a positive electrode comprising an electrode active material which intercalates with the alkali metal;
   c) activating the negative and positive electrodes with a nonaqueous electrolyte; and
   d) providing a sulfate additive in the electrolyte, wherein the sulfite additive has the general formula: $R^1OS(=O)_2(OR^2)$ and is selected from the group consisting of a silyl sulfate, a tin sulfate and an organic sulfate having at least one unsaturated hydrocarbon containing a $C(sp^2$ or $sp^3)$—$C(sp^3)$ bond unit having the $C(sp^3)$ carbon directly connected to the—$OSO_3$— functional group and wherein $R^1$ and $R^2$ are the same or different and they can both be a hydrogen atom or an organic group containing 1 to 12 carbon atoms, and wherein at least $R^1$ has the structure $(R^3)(R^4)(R^5)C$— if $R^2 \neq H$ with at least $R^3$ being an aromatic substituent or an unsaturated organic or inorganic group and wherein if any of the remaining groups of $R^4$ and $R^5$ is a saturated organic group, the saturated organic group contains 1 to 11 carbon atoms.

35. The method of claim 34 including providing the electrolyte comprising a quaternary, nonaqueous carbonate solvent mixture.

* * * * *

UNITED STATES PATENT AND TRADEMARK OFFICE
CERTIFICATE OF CORRECTION

PATENT NO. : 6,350,546 B1
DATED : February 26, 2002
INVENTOR(S) : Gan et al.

It is certified that error appears in the above-identified patent and that said Letters Patent is hereby corrected as shown below:

<u>Title page,</u>
Item [63], "Jan. 20, 1988" should be -- Jan. 20, 1998 --

Signed and Sealed this

Twenty-fifth Day of June, 2002

Attest:

Attesting Officer

JAMES E. ROGAN
*Director of the United States Patent and Trademark Office*